(12) United States Patent
Nozu

(10) Patent No.: US 10,549,633 B2
(45) Date of Patent: Feb. 4, 2020

(54) FOUR-WHEEL-DRIVE VEHICLE AND METHOD OF CONTROLLING FOUR-WHEEL-DRIVE VEHICLE

(71) Applicant: JTEKT CORPORATION, Osaka-shi (JP)

(72) Inventor: Tomohiro Nozu, Anjo (JP)

(73) Assignee: JTEKT CORPORATION, Osaka-shi (JP)

(*) Notice: Subject to any disclaimer, the term of this patent is extended or adjusted under 35 U.S.C. 154(b) by 1 day.

(21) Appl. No.: 16/104,234

(22) Filed: Aug. 17, 2018

(65) Prior Publication Data

US 2019/0061524 A1 Feb. 28, 2019

(30) Foreign Application Priority Data

Aug. 25, 2017 (JP) ................. 2017-161906

(51) Int. Cl.
*F16D 11/14* (2006.01)
*F16D 11/00* (2006.01)
(Continued)

(52) U.S. Cl.
CPC ........ *B60K 23/0808* (2013.01); *B60K 17/344* (2013.01); *B60K 23/04* (2013.01); *F16D 11/14* (2013.01); *F16D 13/52* (2013.01); *F16D 21/08* (2013.01); *F16D 25/0638* (2013.01); *F16D 48/06* (2013.01); *B60K 2023/0833* (2013.01); *B60K 2023/0841* (2013.01); *B60K 2023/0858* (2013.01); *B60Y 2300/18025* (2013.01); *F16D 2011/002* (2013.01);
(Continued)

(58) Field of Classification Search
CPC .. B60K 23/0808; B60K 23/04; B60K 17/344; B60K 2023/0833; B60K 2023/0841; B60K 2023/0858; B60K 17/34; B60K 17/02; F16D 48/06; F16D 25/0638; F16D 21/08; F16D 13/52; F16D 11/14; F16D 2500/70408; F16D 2500/50825; F16D 2500/5075; F16D 2500/3144; F16D 2500/3124; F16D 2500/3118; F16D 2500/1107; F16D 2500/1045; F16D 2500/10425; F16D 2011/002; B60Y 2300/18025
See application file for complete search history.

(56) References Cited

U.S. PATENT DOCUMENTS

2017/0182885 A1 6/2017 Suzuki et al.

FOREIGN PATENT DOCUMENTS

JP 2017-114432 6/2017

*Primary Examiner* — David J Hlavka
(74) *Attorney, Agent, or Firm* — Oblon, McClelland, Maier & Neustadt, L.L.P.

(57) ABSTRACT

A four-wheel-drive vehicle includes: a pump that is actuated by an electric motor; a friction clutch that has a plurality of clutch plates that are pressed by a piston that is movable by working oil discharged from the pump; a control device that controls the electric motor; front wheels, to which a drive force of an engine is always transferred; and rear wheels, to which the drive force of the engine is transferred in accordance with the fastening force of the friction clutch. When it is determined that the vehicle is in a high fastening force-requiring state in which it is necessary for the friction clutch to transfer a large drive force temporarily, the control device causes the electric motor to output torque that is larger than torque that the electric motor can continuously output.

7 Claims, 9 Drawing Sheets

(51) Int. Cl.
*B60K 23/08* (2006.01)
*B60K 17/344* (2006.01)
*B60K 23/04* (2006.01)
*F16D 13/52* (2006.01)
*F16D 21/08* (2006.01)
*F16D 25/0638* (2006.01)
*F16D 48/06* (2006.01)

(52) U.S. Cl.
CPC ............... *F16D 2500/1045* (2013.01); *F16D 2500/10425* (2013.01); *F16D 2500/1107* (2013.01); *F16D 2500/3118* (2013.01); *F16D 2500/3124* (2013.01); *F16D 2500/3144* (2013.01); *F16D 2500/5075* (2013.01); *F16D 2500/50825* (2013.01); *F16D 2500/70408* (2013.01)

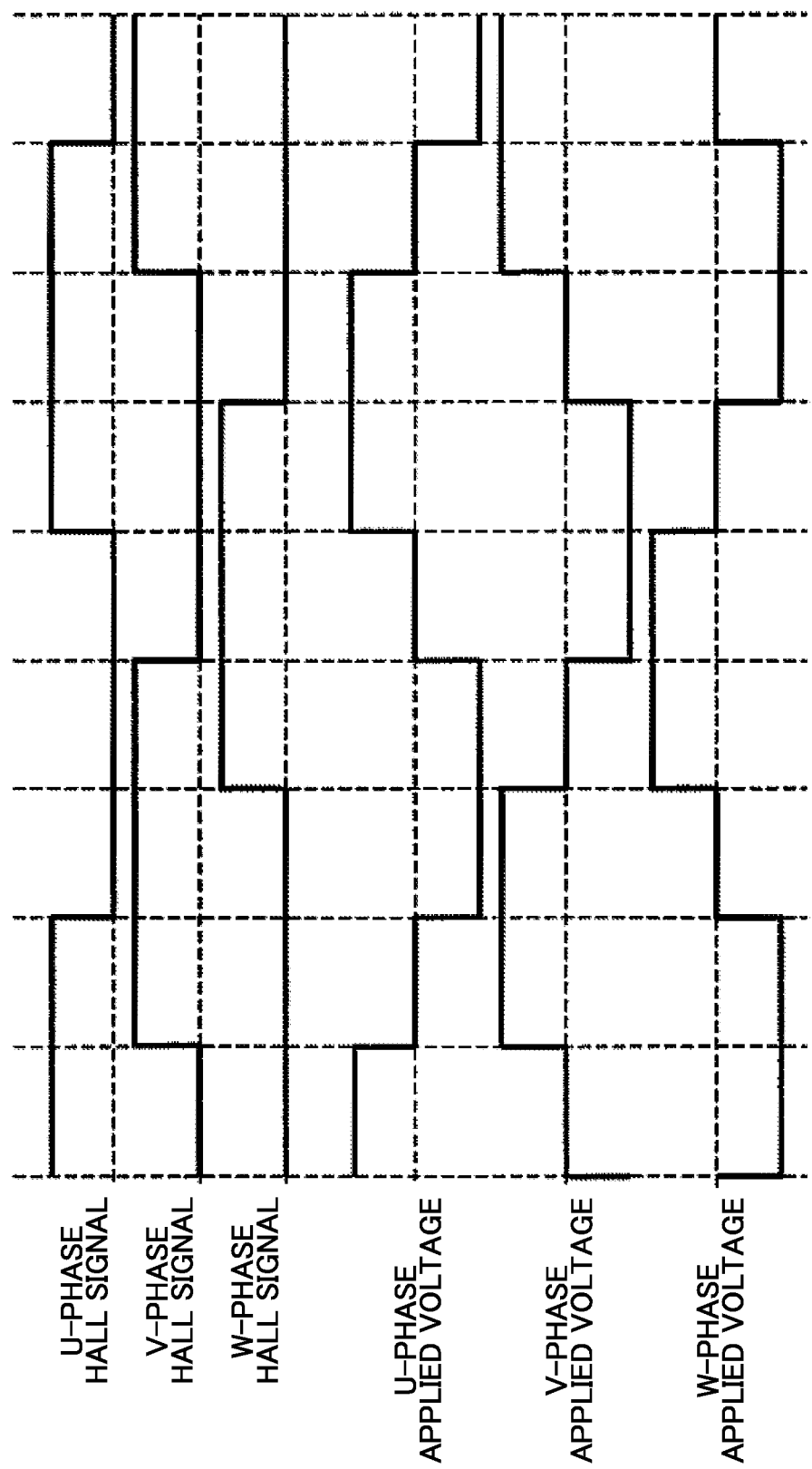

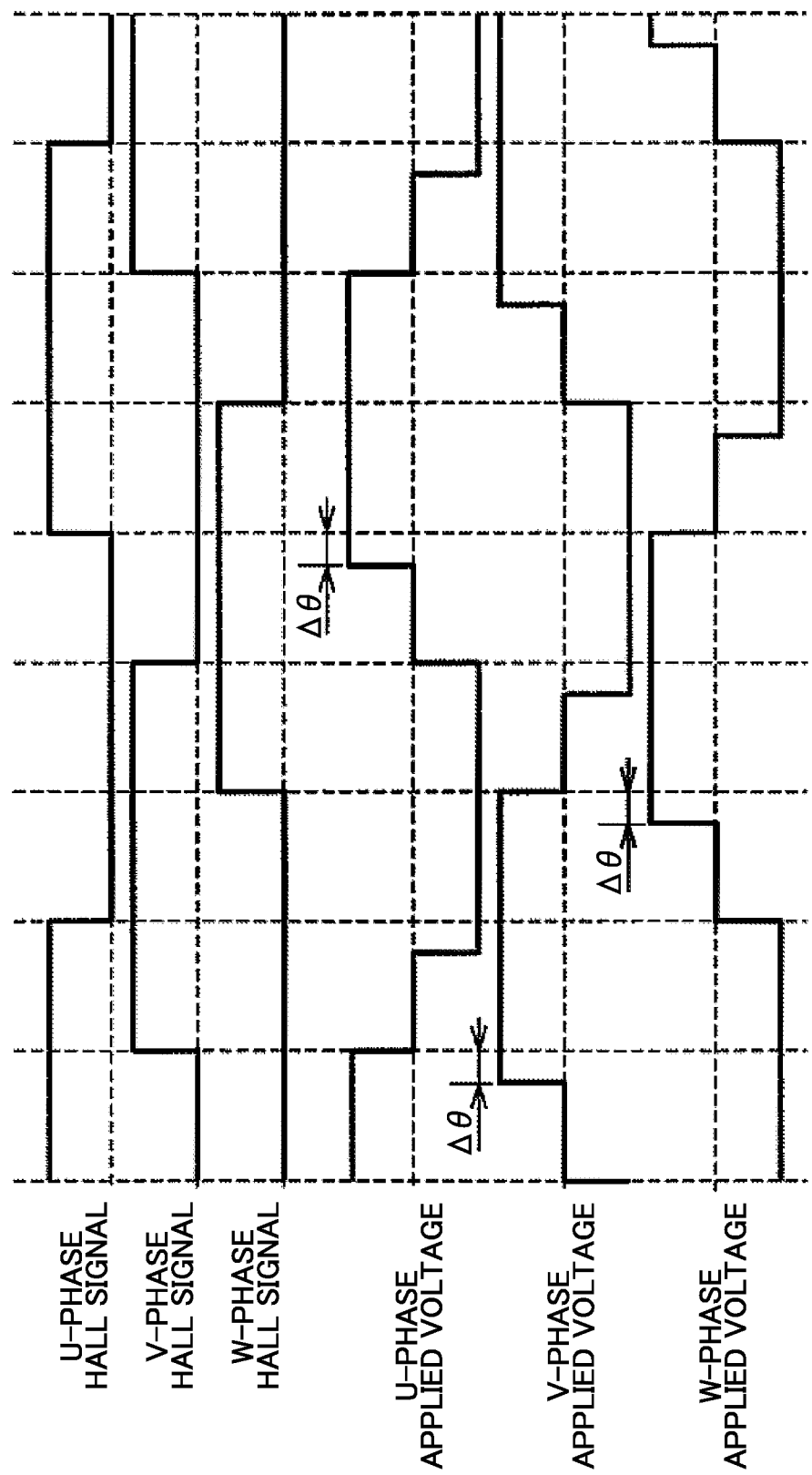

FOUR-WHEEL-DRIVE VEHICLE AND METHOD OF CONTROLLING FOUR-WHEEL-DRIVE VEHICLE

INCORPORATION BY REFERENCE

The disclosure of Japanese Patent Application No. 2017-161906 filed on Aug. 25, 2017 including the specification, drawings and abstract, is incorporated herein by reference in its entirety.

BACKGROUND OF THE INVENTION

1. Field of the Invention

The present invention relates to a four-wheel-drive vehicle and a method of controlling a four-wheel-drive vehicle.

2. Description of the Related Art

Some of four-wheel-drive vehicles according to the related art that include main drive wheels, to which a drive force of a drive source is always transferred, and auxiliary drive wheels, to which the drive force of the drive source is transferred when necessary in accordance with the vehicle state, include a pump that is actuated by torque of an electric motor, a piston that is movable by the pressure of a working fluid discharged from the pump, a friction clutch that has a plurality of clutch plates that are pressed by the piston, and a control device that controls the electric motor, the drive force being transferred to the auxiliary drive wheels via the friction clutch. See Japanese Patent Application Publication No. 2017-114432 (JP 2017-114432 A), for example.

The friction clutch described in JP 2017-114432 A has a plurality of outer clutch plates coupled to a clutch drum so as not to be rotatable relative to the clutch drum and a plurality of inner clutch plates coupled to an inner shaft so as not to be rotatable relative to the inner shaft, the outer clutch plates and the inner clutch plates being disposed alternately along the axial direction. When the electric motor is rotated and a working fluid is discharged from the pump, the piston presses the friction clutch to bring the outer clutch plates and the inner clutch plates into frictional contact with each other, and a drive force is transferred to the auxiliary drive wheels (sub drive wheels) by a generated friction force.

In the four-wheel-drive vehicle according to the related art configured as described above, the maximum drive force that needs to be transferred to the auxiliary drive wheels is determined on the assumption of various travel states, and the number of clutch plates (outer clutch plates and inner clutch plates) of the friction clutch is decided such that the maximum drive force is transferred to the auxiliary drive wheels when a rated current (rated continuous current) is supplied to the electric motor. As the number of clutch plates is larger, the maximum drive force that can be transferred to the auxiliary drive wheels can be made larger. If the number of clutch plates is large, however, the cost and the size of the friction clutch are increased.

The inventor has made a diligent study with the intention to reduce the cost and the size of the friction clutch by reducing the number of clutch plates without reducing a drive force that can be transferred to the auxiliary drive wheels, and has achieved the present invention by placing a focus on the fact that the maximum drive force needs to be transferred to the auxiliary drive wheels only temporarily.

SUMMARY OF THE INVENTION

It is an object of the present invention to provide a four-wheel-drive vehicle and a method of controlling a four-wheel-drive vehicle that are capable of reducing the cost and the size of a friction clutch by reducing the number of clutch plates without reducing a drive force that can be transferred to auxiliary drive wheels.

An aspect of the present invention provides a four-wheel-drive vehicle including:
an electric motor;
a pump that is actuated by torque output from the electric motor;
a piston that is movable by a pressure of a working fluid discharged from the pump;
a friction clutch that has a plurality of clutch plates that are pressed by the piston;
a control device that controls the electric motor;
a drive source that generates a drive force in accordance with an accelerator operation amount;
main drive wheels to which the drive force of the drive source is always transferred; and
auxiliary drive wheels to which the drive force of the drive source is transferred in accordance with a fastening force of the friction clutch.

The control device causes the electric motor to output torque that is larger than torque that the electric motor can continuously output when it is determined, on the basis of vehicle information including respective wheel speeds of the main drive wheels and the auxiliary drive wheels and the accelerator operation amount, that the vehicle is in a high fastening force-requiring state in which it is necessary for the friction clutch to transfer a large drive force temporarily.

With the four-wheel-drive vehicle according to the aspect described above, it is possible to reduce the cost and the size of a friction clutch by reducing the number of clutch plates without reducing a drive force that can be transferred to auxiliary drive wheels.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 7A is a graph illustrating an example of the on/off states of Hall sensors and the voltages applied to U-, V-, and W-phases during rotation of the electric motor;

FIG. 7B is a graph illustrating an example of the on/off states of the Hall sensors and the voltages applied to U-, V-, and W-phases during rotation of the electric motor.

DETAILED DESCRIPTION OF EMBODIMENTS

An embodiment of the present invention will be described with reference to FIGS. 1 to 7.

Figure 1:
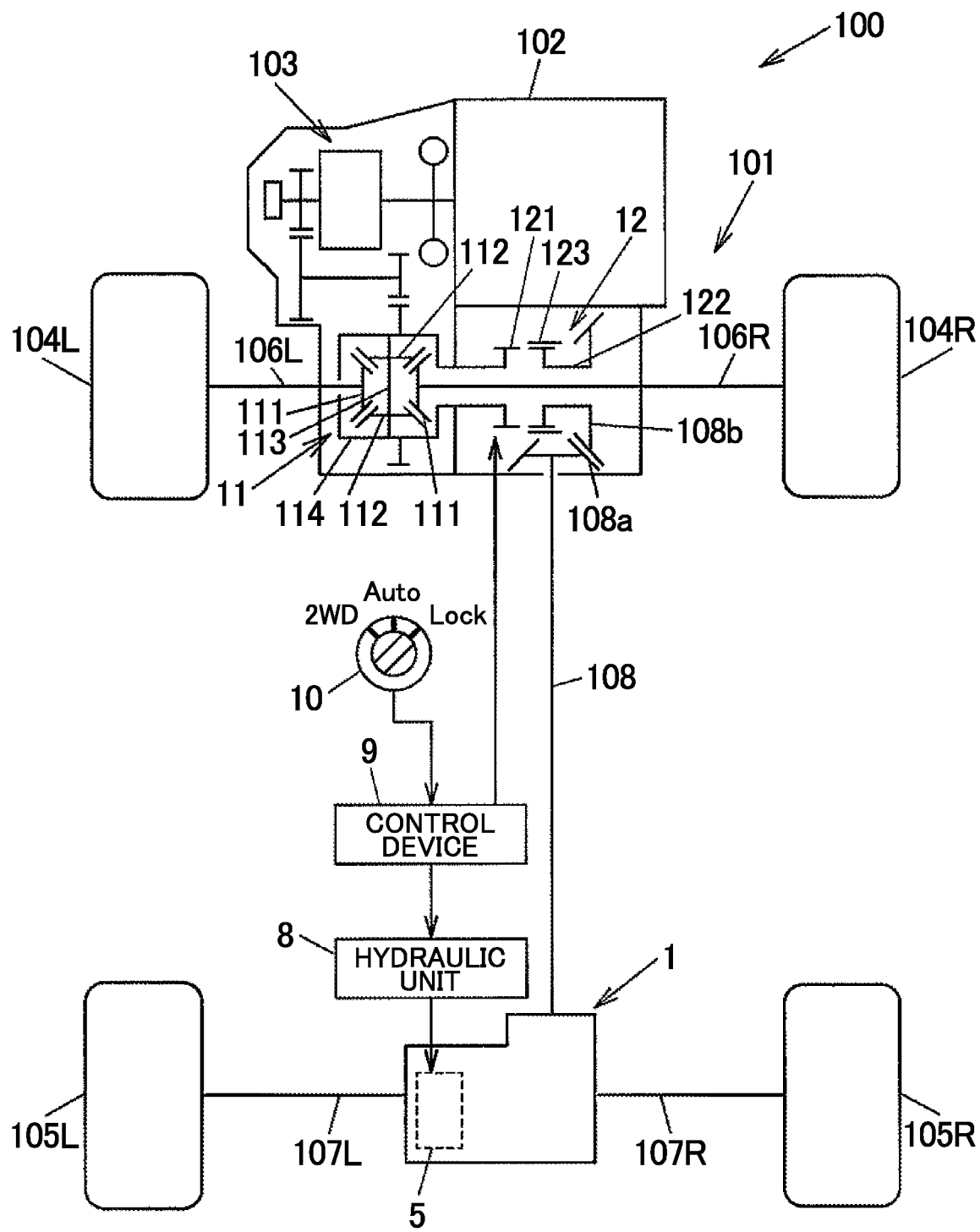
FIG. 1 is a diagram illustrating an example of the configuration of a four-wheel-drive vehicle according to an embodiment of the present invention.

FIG. 1 is a diagram schematically illustrating an example of the configuration of a four-wheel-drive vehicle according to an embodiment of the present invention. A four-wheel-drive vehicle 100 includes an engine 102 that serves as a drive source that generates a drive force for travel, a transmission 103, a pair of right and left front wheels 104R, 104L that serve as main drive wheels, a pair of right and left rear wheels 105R, 105L that serve as auxiliary drive wheels, a drive force transfer system 101 that transfers the drive force of the engine 102 to the front wheels 104R, 104L and the rear wheels 105R, 105L, a hydraulic unit 8, and a control device 9 that controls the hydraulic unit 8. The engine 102 generates a drive force in accordance with the amount (accelerator operation amount) of depression of an accelerator pedal that is subjected to a depressing operation performed by a driver. The drive source is not limited to the engine 102 which is an internal combustion engine, and may be an electric motor such as a synchronous motor or a drive source constituted by combining an internal combustion engine and an electric motor.

The four-wheel-drive vehicle 100 is switchable between a four-wheel-drive state, in which the drive force of the engine 102 is transferred to the front wheels 104R, 104L and the rear wheels 105R, 105L, and a two-wheel-drive state, in which the drive force of the engine 102 is transferred to only the front wheels 104R, 104L. In the present embodiment, the symbols "R" and "L" represent the right side and the left side, respectively, with respect to the direction of forward travel of the vehicle.

The drive force transfer system 101 has, as its constituent elements: a front differential 11; a mesh clutch 12 that can block transfer of the drive force; a propeller shaft 108 that extends in the vehicle front-rear direction; a drive force transfer device 1 that is actuated upon receiving supply of working oil from the hydraulic unit 8; drive shafts 106R, 106L on the front wheel side; and drive shafts 107R, 107L on the rear wheel side. The drive force of the engine 102 is always transferred to the front wheels 104R, 104L. The drive force of the engine 102 is transferred to the rear wheels 105R, 105L via the mesh clutch 12, the propeller shaft 108, and the drive force transfer device 1.

During travel in the two-wheel-drive state, rotation of the propeller shaft 108 which is a part of the drive force transfer system 101 is stopped with both transfer of a drive force through the mesh clutch 12 and transfer of a drive force through the drive force transfer device 1 blocked. Consequently, a power loss that accompanies rotation of the propeller shaft 108 is reduced, which improves the fuel efficiency. In the four-wheel-drive state, meanwhile, a drive force is transferred to the rear wheels 105R, 105L via the mesh clutch 12, the propeller shaft 108, and the drive force transfer device 1. The drive force transfer device 1 can adjust a drive force transferred to the rear wheels 105R, 105L in accordance with the pressure of working oil supplied from the hydraulic unit 8.

The control device 9 can acquire a signal that indicates the select state of a select switch 10 that is subjected to a selecting operation performed by the driver. The driver can select one of a 2WD mode, in which the drive state of the four-wheel-drive vehicle 100 is fixed to the two-wheel-drive state, a lock mode, in which the drive state of the four-wheel-drive vehicle 100 is fixed to the four-wheel-drive state, and an auto mode, in which the drive state of the four-wheel-drive vehicle 100 is automatically switched between the two-wheel-drive state and the four-wheel-drive state in accordance with the travel state, by operating the select switch 10.

The front differential 11 has: a pair of side gears 111 coupled to the pair of drive shafts 106R, 106L on the front wheel side; a pair of pinion gears 112 meshed with the pair of side gears 111 with their gear axes orthogonal to each other; a pinion gear support member 113 that supports the pair of pinion gears 112; and a front differential case 114 that houses the pair of side gears 111, the pair of pinion gears 112, and the pinion gear support member 113. A drive force of the engine 102, the speed of which has been changed by the transmission 103, is transferred to the front differential case 114.

The mesh clutch 12 has: a first rotary member 121 that is rotatable together with the front differential case 114; a second rotary member 122 disposed side by side with the first rotary member 121 in the axial direction; and a sleeve 123 that is capable of coupling the first rotary member 121 and the second rotary member 122 so as not to be rotatable relative to each other. The sleeve 123 is moved in the axial direction by an actuator (not illustrated) controlled by the control device 9 between a coupled position, at which the sleeve 123 is meshed with the first rotary member 121 and the second rotary member 122, and a non-coupled position, at which the sleeve 123 is meshed with only the second rotary member 122. When the sleeve 123 is located at the coupled position, the first rotary member 121 and the second rotary member 122 are coupled so as not to be rotatable relative to each other. When the sleeve 123 is located at the non-coupled position, the first rotary member 121 and the second rotary member 122 are rotatable relative to each other.

The propeller shaft 108 receives torque of the engine 102 from the front differential case 114 via the mesh clutch 12, and transfers the torque to the drive force transfer device 1 side. A pinion gear 108a is provided at an end portion of the propeller shaft 108 on the front wheel side. The pinion gear 108a is meshed with a ring gear 108b coupled to the second rotary member 122 of the mesh clutch 12 so as not be rotatable relative to the second rotary member 122 of the mesh clutch 12. The drive force transfer device 1 distributes the drive force which is input from the propeller shaft 108 to the drive shafts 107R, 107L on the rear wheel side while allowing differential motion. The drive shaft 107R is coupled to the right rear wheel 105R. The drive shaft 107L is coupled to the left rear wheel 105L.

In the drive force transfer system 101, as described above, a drive force is transferred to the propeller shaft 108 via the mesh clutch 12, and a drive force is transferred to the drive force transfer device 1 via the propeller shaft 108. When switching is made to the four-wheel-drive state during travel in the two-wheel-drive state, in which rotation of the propeller shaft 108 is stopped with both transfer of a drive force through the mesh clutch 12 and transfer of a drive force through the drive force transfer device 1 blocked, the control device 9 rotates the propeller shaft 108 by transferring a drive force from the rear wheels 105R, 105L to the propeller shaft 108 through the drive force transfer device 1. When rotation of the first rotary member 121 and rotation of the second rotary member 122 are synchronized with each other, the actuator of the mesh clutch 12 is controlled so as to move the sleeve 123 to the coupled position, which brings the mesh clutch 12 into an engaged state in which a drive force can be transferred. Consequently, a drive force can be transferred to the rear wheels 105R, 105L.

Figure 2:
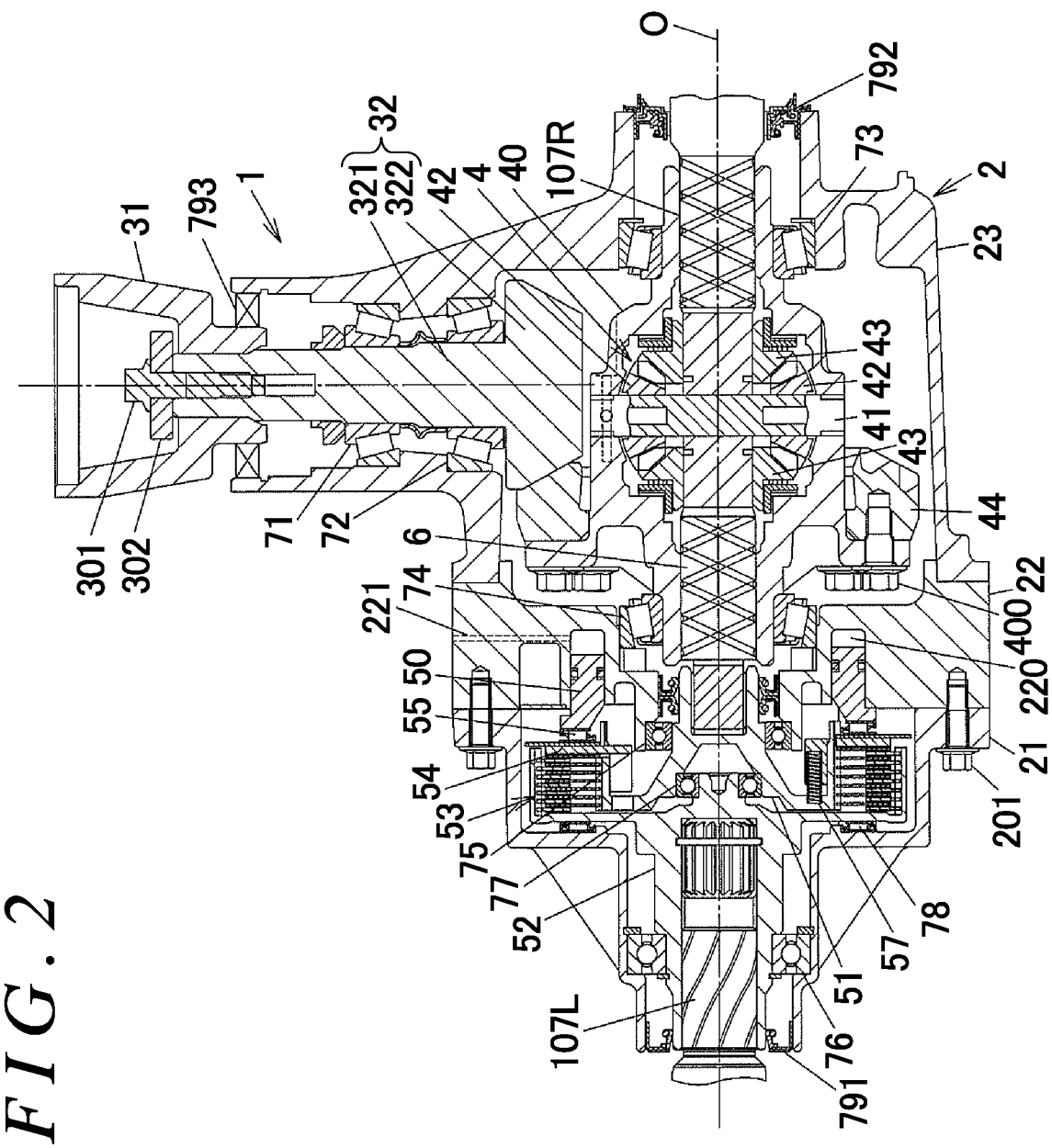
FIG. 2 is a sectional view illustrating an example of the configuration of a drive force transfer device.
Figure 3:
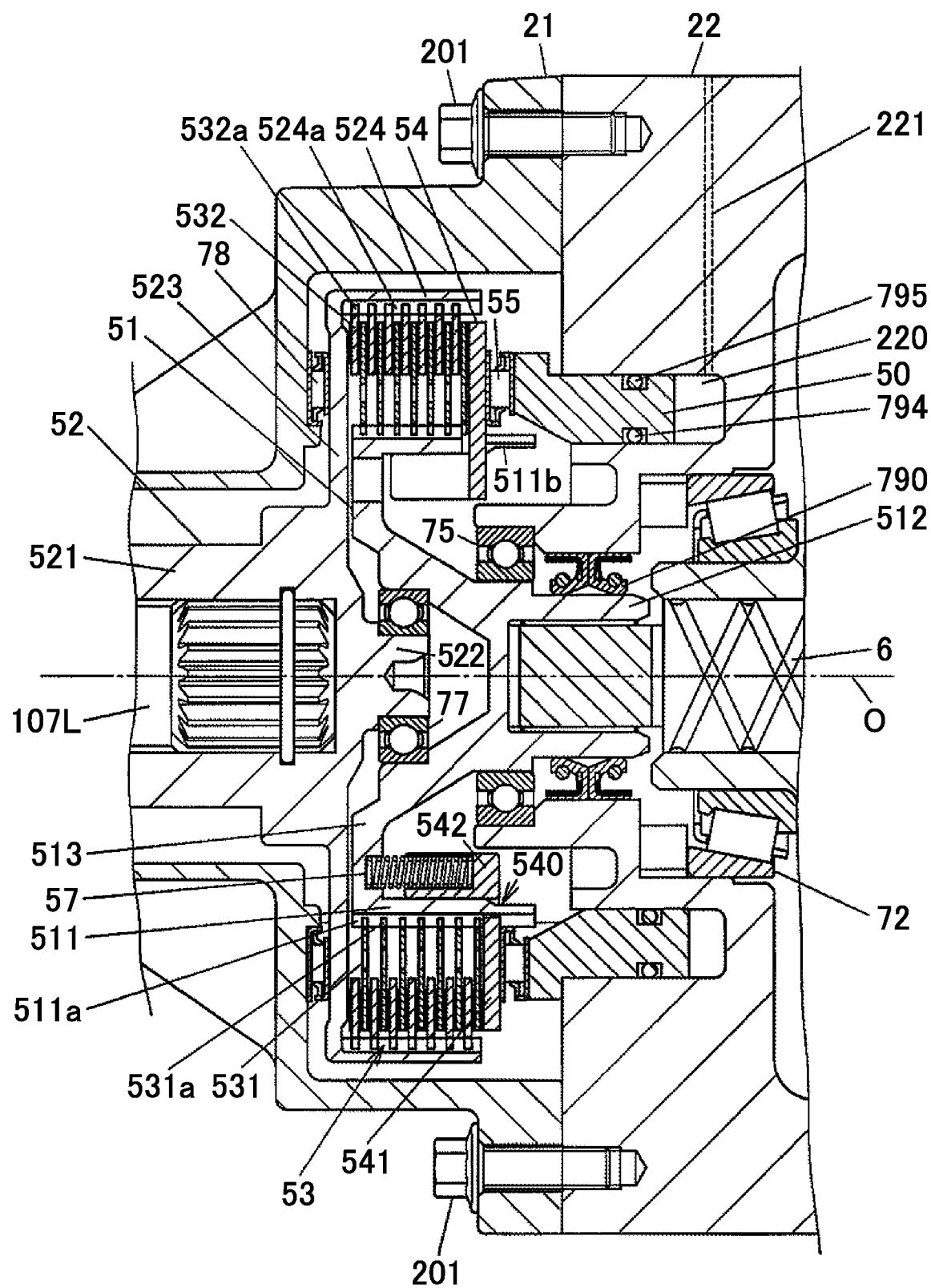
FIG. 3 is a partial enlarged view of FIG. 2.

FIG. 2 is a sectional view illustrating an example of the configuration of the drive force transfer device 1. FIG. 3 is a partial enlarged view of FIG. 2. In FIG. 2, the entire drive force transfer device 1 is illustrated together with a part of the drive shafts 107R, 107L on the rear wheel side.

The drive force transfer device 1 includes: a device case 2 supported by the vehicle body; a coupling member 31 to which the propeller shaft 108 is coupled; a pinion gear shaft 32 that is rotatable together with the coupling member 31; a differential case 40 that is rotatable upon receiving a drive force of the engine 102 from the pinion gear shaft 32; a differential gear mechanism 4 that outputs the drive force which is input to the differential case 40 from a pair of side gears 43 while allowing differential motion; a clutch mechanism 5 that transfers a drive force between one of the side gears 43 of the differential gear mechanism 4 and the drive shaft 107L; and an intermediate shaft 6 in a shaft shape disposed between the differential gear mechanism 4 and the clutch mechanism 5.

The coupling member 31 and the pinion gear shaft 32 are coupled to each other by a bolt 301 and a washer 302. The pinion gear shaft 32 has a shaft portion 321 and a gear portion 322. The shaft portion 321 is rotatably supported by a pair of tapered roller bearings 71, 72. The gear portion 322 is meshed with a ring gear 44 fixed by a plurality of bolts 400 so as to rotate together with the differential case 40. The gear portion 322 of the pinion gear shaft 32 and the ring gear 44 are hypoid gears, for example, and are lubricated by gear oil sealed in the device case 2.

The differential gear mechanism 4 has: a pinion shaft 41 supported by the differential case 40; a pair of pinion gears 42 supported by the pinion shaft 41; and the pair of side gears 43 which are meshed with the pair of pinion gears 42 with their gear axes orthogonal to each other. The differential case 40 is supported by tapered roller bearings 73, 74 so as to be rotatable with respect to the device case 2. The intermediate shaft 6 is coupled to the one of the pair of side gears 43 so as not to be rotatable relative to the one of the pair of side gears 43. The clutch mechanism 5 can allow and block transfer of a drive force input from the intermediate shaft 6 to the drive shaft 107L in an adjustable manner.

When the four-wheel-drive vehicle 100 is traveling forward, and the drive force which is transferred from the one of the side gears 43 to the drive shaft 107L through the intermediate shaft 6 and the clutch mechanism 5 is adjusted, a drive force that is equivalent to the drive force which is transferred to the drive shaft 107L is also transferred to the drive shaft 107R through the differential function of the differential gear mechanism 4. The drive shaft 107R is coupled to the other of the pair of side gears 43 so as not to be rotatable relative to the other of the pair of side gears 43, which is on the opposite side from the intermediate shaft 6, through spline fitting. The drive shaft 107L is coupled to a coupling portion 521 of a second rotary member 52 to be discussed later so as not to be rotatable relative to the coupling portion 521 of a second rotary member 52 through spline fitting. When transfer of a drive force to the drive shaft 107L through the clutch mechanism 5 is blocked, a drive force is not transferred to the drive shaft 107R, either.

The clutch mechanism 5 has: a piston 50 that is moved by the pressure of working oil supplied from the hydraulic unit 8; a first rotary member 51 that is rotatable together with the intermediate shaft 6; the second rotary member 52 which is rotatable together with the drive shaft 107L; a friction clutch 53 disposed between the first rotary member 51 and the second rotary member 52; and a pressure plate 54 and a thrust roller bearing 55 disposed between the piston 50 and the friction clutch 53. The clutch mechanism 5 outputs a drive force input to the first rotary member 51 from the second rotary member 52 to the drive shaft 107L.

As illustrated in FIG. 3, the friction clutch 53 is composed of: a plurality of inner clutch plates 531 that are rotatable together with the first rotary member 51; and a plurality of outer clutch plates 532 that are rotatable together with the second rotary member 52. Frictional sliding between the inner clutch plates 531 and the outer clutch plates 532 is lubricated by lubricating oil (not illustrated). The plurality of inner clutch plates 531 and the plurality of outer clutch plates 532 are disposed alternately along the axial direction.

The piston 50 presses the friction clutch 53 through axial movement along a rotational axis O of the first rotary member 51 and the second rotary member 52. The friction clutch 53 transfers a drive force between the first rotary member 51 and the second rotary member 52 using a friction force between the plurality of inner clutch plates 531 and the plurality of outer clutch plates 532 generated upon receiving a pressing force of the piston 50 via the pressure plate 54 and the thrust roller bearing 55. The friction force between the plurality of inner clutch plates 531 and the plurality of outer clutch plates 532 serves as a fastening force that fastens the first rotary member 51 and the second rotary member 52 to each other. The drive force of the engine 102 is transferred to the rear wheels 105R, 105L in accordance with the fastening force of the friction clutch 53.

The first rotary member 51 has: a cylindrical portion 511 in a cylindrical shape, on the outer peripheral surface of which a spline engagement portion 511a composed of a plurality of spline projections that extend along the axial direction is formed; a coupling portion 512 in a bottomed cylindrical shape which is smaller in diameter than the cylindrical portion 511 and to which the intermediate shaft 6 is coupled through spline fitting; and a connection portion 513 that connects between the cylindrical portion 511 and the coupling portion 512. The cylindrical portion 511, the coupling portion 512, and the connection portion 513 are integral with each other. A seal member 790 supported by the device case 2 makes sliding contact with the outer peripheral surface of the coupling portion 512. The seal member 790 separates a housing space for the clutch mechanism 5 and a housing space for the differential gear mechanism 4 from each other.

The pressure plate 54 is formed with an insertion hole 540 that allows insertion of a projection 511b formed at an end portion of the cylindrical portion 511 of the first rotary member 51. The pressure plate 54 is not rotatable relative to, and is movable in the axial direction with respect to, the first rotary member 51. The pressure plate 54 has: a pressing portion 541 disposed on the outer peripheral side with respect to the cylindrical portion 511 of the first rotary member 51 to press the friction clutch 53; and an inner wall portion 542 disposed on the inner side of the cylindrical portion 511. The insertion hole 540 is formed between the pressing portion 541 and the inner wall portion 542. A plurality of coil springs 57 are disposed, as compressed in the axial direction, between the inner wall portion 542 of the pressure plate 54 and the connection portion 513 of the first rotary member 51. In FIGS. 2 and 3, one of such coil springs 57 is illustrated. The plurality of coil springs 57 urge the pressure plate 54 toward the piston 50 using their restoring force.

The second rotary member 52 is placed in parallel with the first rotary member 51 in the axial direction. As illustrated in FIG. 3, the second rotary member 52 has: the coupling portion 521 to which the drive shaft 107L is coupled; a boss portion 522 that projects in the axial direction from an end portion of the coupling portion 521 on the first rotary member 51 side; a wall portion 523 in an annular shape that bulges outward from the coupling portion 521; and a cylindrical portion 524 in a cylindrical shape that extends in the axial direction from an outer peripheral end portion of the wall portion 523. The coupling portion 521, the boss portion 522, the wall portion 523, and the cylindrical portion 524 are integral with each other.

The friction clutch 53 is disposed between the cylindrical portion 511 of the first rotary member 51 and the cylindrical portion 524 of the second rotary member 52. A plurality of projections 531a are formed at an end portion of the inner clutch plates 531 on the inner peripheral side to be engaged with the spline engagement portion 511a of the cylindrical portion 511 of the first rotary member 51. Consequently, the inner clutch plates 531 are coupled to the first rotary member 51 so as to be movable in the axial direction with respect to, and so as not to be rotatable relative to, the first rotary member 51. A plurality of projections 532a are formed at an end portion of the outer clutch plates 532 on the outer peripheral side to be engaged with a spline engagement portion 524a formed on the inner peripheral surface of the cylindrical portion 524 of the second rotary member 52. Consequently, the outer clutch plates 532 are coupled to the second rotary member 52 so as to be movable in the axial direction with respect to, and so as not to be rotatable relative to, the second rotary member 52.

The first rotary member 51 is supported by a ball bearing 75 attached to the device case 2. The second rotary member 52 is supported by a ball bearing 76 disposed between the coupling portion 521 and the inner surface of the device case 2. A ball bearing 77 is disposed between the outer peripheral surface of the boss portion 522 of the second rotary member 52 and the first rotary member 51. A thrust roller bearing 78 is disposed between the wall portion 523 of the second rotary member 52 and the inner surface of the first case member 21.

The device case 2 has: a first case member 21 that houses the clutch mechanism 5; a second case member 22 formed with a cylinder chamber 220; and a third case member 23 that houses the differential gear mechanism 4 and the differential case 40. The first case member 21 and the second case member 22, and the second case member 22 and the third case member 23, are coupled to each other by bolts, for example. In FIGS. 2 and 3, a plurality of bolts 201 that couple the first case member 21 and the second case member 22 to each other are illustrated.

A seal member 791 is fitted with the inner surface of an insertion hole of the first case member 21 through which the second rotary member 52 is inserted. A seal member 792 is fitted with the inner surface of an insertion hole of the third case member 23 through which the drive shaft 107R is inserted. A seal member 793 is fitted with the inner surface of an insertion hole of the third case member 23 through which the coupling member 31 and the pinion gear shaft 32 are inserted.

The second case member 22 is provided with: the cylinder chamber 220 in an annular shape which is supplied with working oil that applies a hydraulic pressure to the piston 50 to move the piston 50 toward the friction clutch 53; and a working oil supply hole 221 through which working oil is supplied to the cylinder chamber 220. The cylinder chamber 220 is formed in a circular ring shape concentrically about the rotational axis O.

The cylinder chamber 220 is supplied with working oil from the hydraulic unit 8 via the working oil supply hole 221. The piston 50 is movable back and forth in the axial direction which is parallel to the rotational axis O with a part of the piston 50 in the axial direction disposed in the cylinder chamber 220, and presses the friction clutch 53 in the axial direction using the hydraulic pressure of working oil supplied to the cylinder chamber 220 to cause the inner clutch plates 531 and the outer clutch plates 532 to frictionally contact each other. The friction clutch 53 is switchable between a transfer state and a blocked state, in which transfer of a drive force is allowed and blocked, respectively, through movement of the piston 50.

When the pressure of working oil in the cylinder chamber 220 is lowered, the piston 50 is moved toward the deeper side of the cylinder chamber 220 by the urging force of the coil springs 57 which is received via the pressure plate 54, and moved away from the friction clutch 53. A circumferential groove is formed in each of the inner peripheral surface and the outer peripheral surface of the piston 50. O-rings 794 and 795 are held in such circumferential grooves.

When the 2WD mode is selected using the select switch 10, the control device 9 controls the hydraulic unit 8 such that a drive force is not transferred by the friction clutch 53. When the lock mode is selected using the select switch 10, meanwhile, the control device 9 controls the hydraulic unit 8 such that no slipping occurs between the inner clutch plates 531 and the outer clutch plates 532 in the friction clutch 53. When the auto mode is selected using the select switch 10, furthermore, the control device 9 controls the hydraulic unit 8 such that the drive force which is transferred by the friction clutch 53 is varied in accordance with the travel state.

Figure 4:
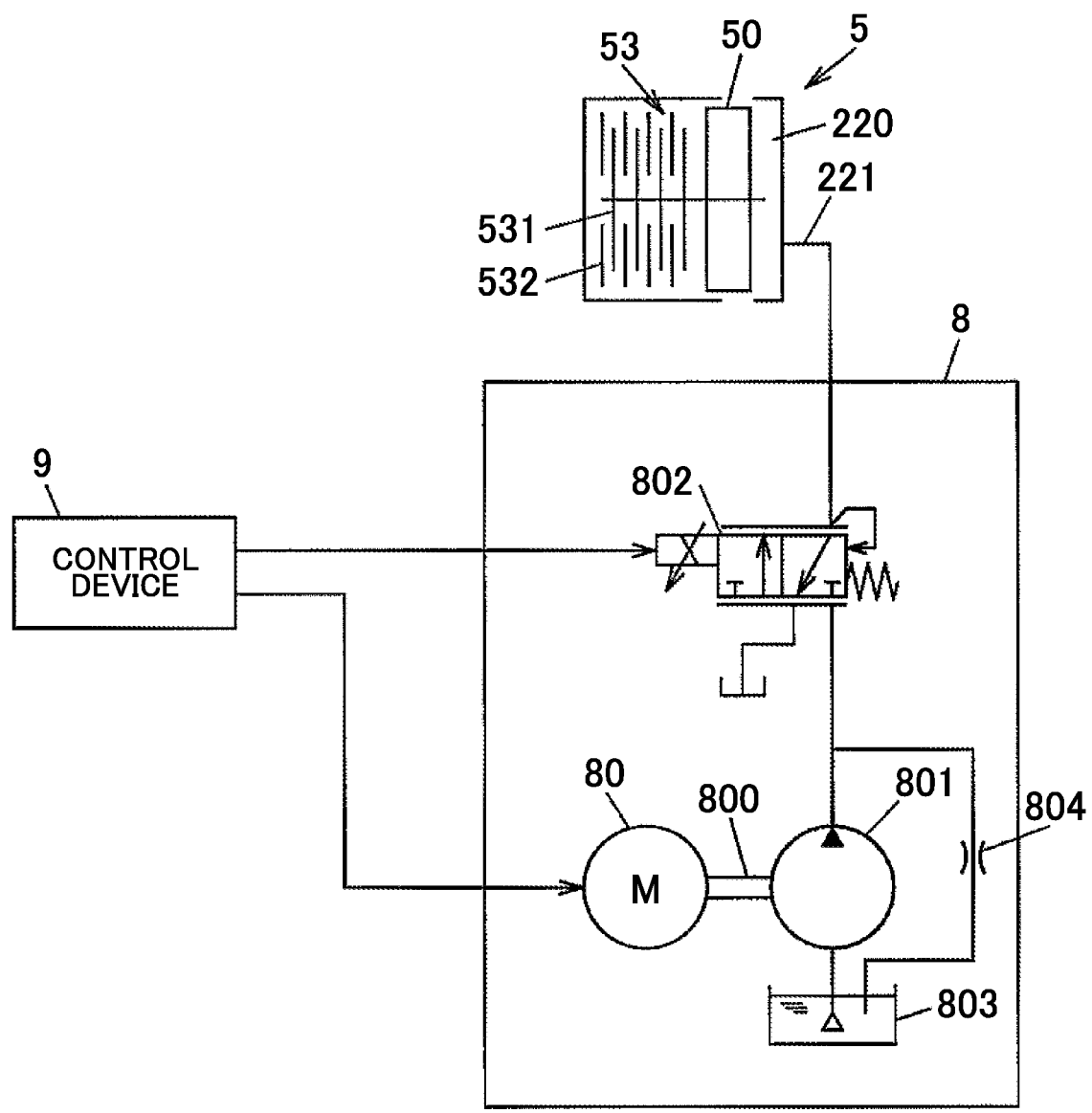
FIG. 4 is a diagram illustrating an example of the configuration of a hydraulic unit.

FIG. 4 is a diagram schematically illustrating an example of the configuration of the hydraulic unit 8. The hydraulic unit 8 has: an electric motor 80 that is controlled by the control device 9; a pump 801 that is actuated by torque output from the electric motor 80 to discharge working oil as a working fluid; an electromagnetic valve 802 that regulates a hydraulic pressure that acts on the piston 50 upon receiving the working oil which is discharged from the pump 801; a reservoir 803 that stores working oil; and an orifice (throttle valve) 804 disposed between the discharge side of the pump 801 and the reservoir 803.

The electric motor 80 is a three-phase brushless motor in which windings for three phases are wound around a stator. A rotor of the electric motor 80 and a rotor of the pump 801 are coupled to each other by a coupling shaft 800. The pump 801 is well known itself, and pumps up an amount of working oil that matches the number of revolutions of the electric motor 80 from the reservoir 803, discharges the working oil, and generates a hydraulic pressure. An external gear pump, an internal gear pump, or a vane pump, for example, can be used as the pump 801.

The electromagnetic valve 802 is a pressure control valve, more specifically an electromagnetic proportional pressure control valve, that regulates the pressure of working oil to be supplied from the pump 801 to the cylinder chamber 220. The electromagnetic valve 802 is disposed between the pump 801 and the cylinder chamber 220 in a flow passage (oil passage) for working oil. The valve opening of the electromagnetic valve 802 is varied in accordance with a control current supplied from the control device 9 to the electromagnetic valve 802. The electromagnetic valve 802 outputs working oil to the cylinder chamber 220 with the pressure of the working oil decreased by discharging a part of working oil discharged from the pump 801. The control device 9 controls the electric motor 80 such that the discharge pressure of the pump 801 is higher than the hydraulic pressure of working oil that should act on the piston 50.

Figure 5:
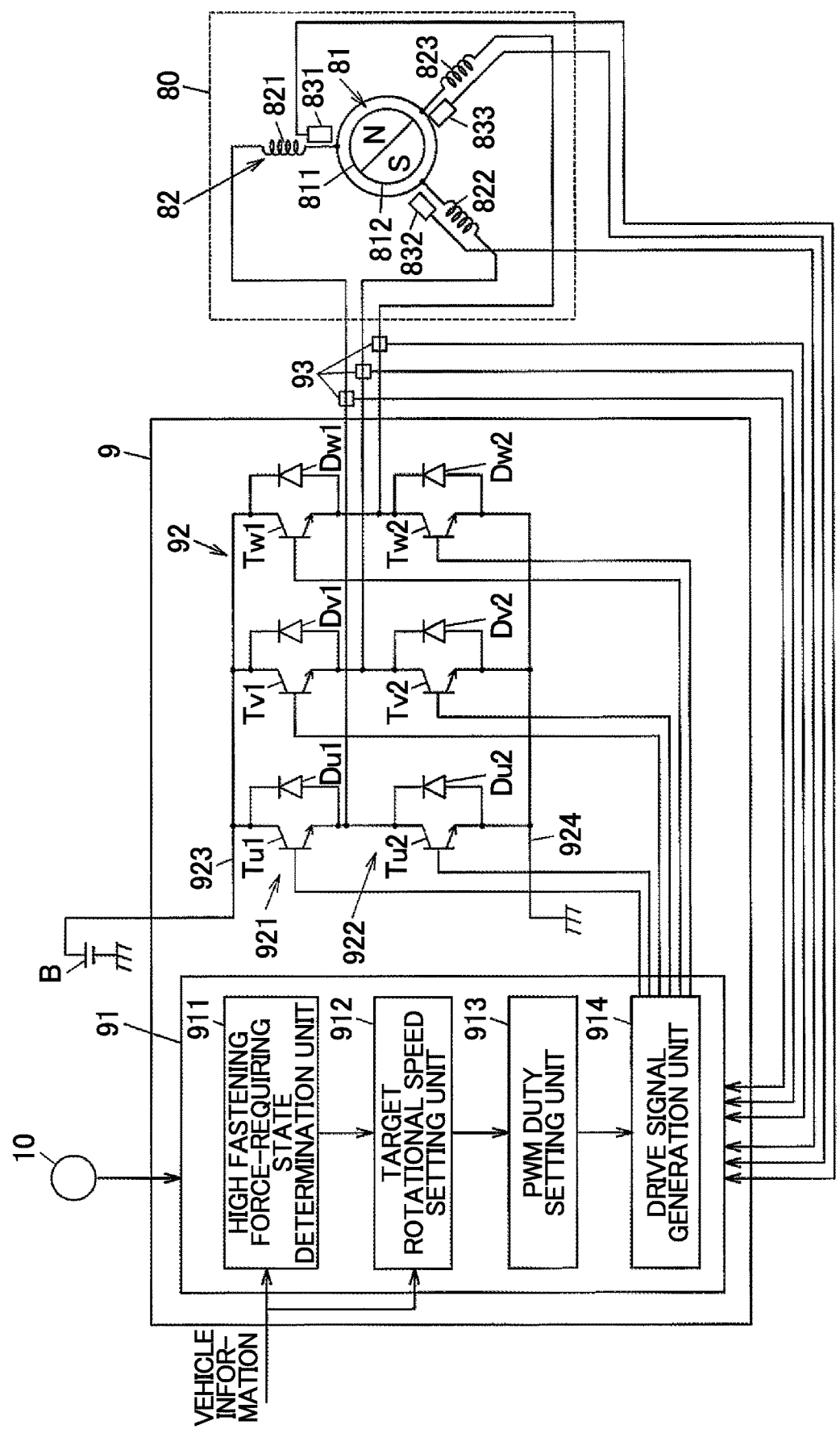
FIG. 5 is a schematic diagram illustrating an example of the configuration of an electric motor and a control device.
Figure 6:
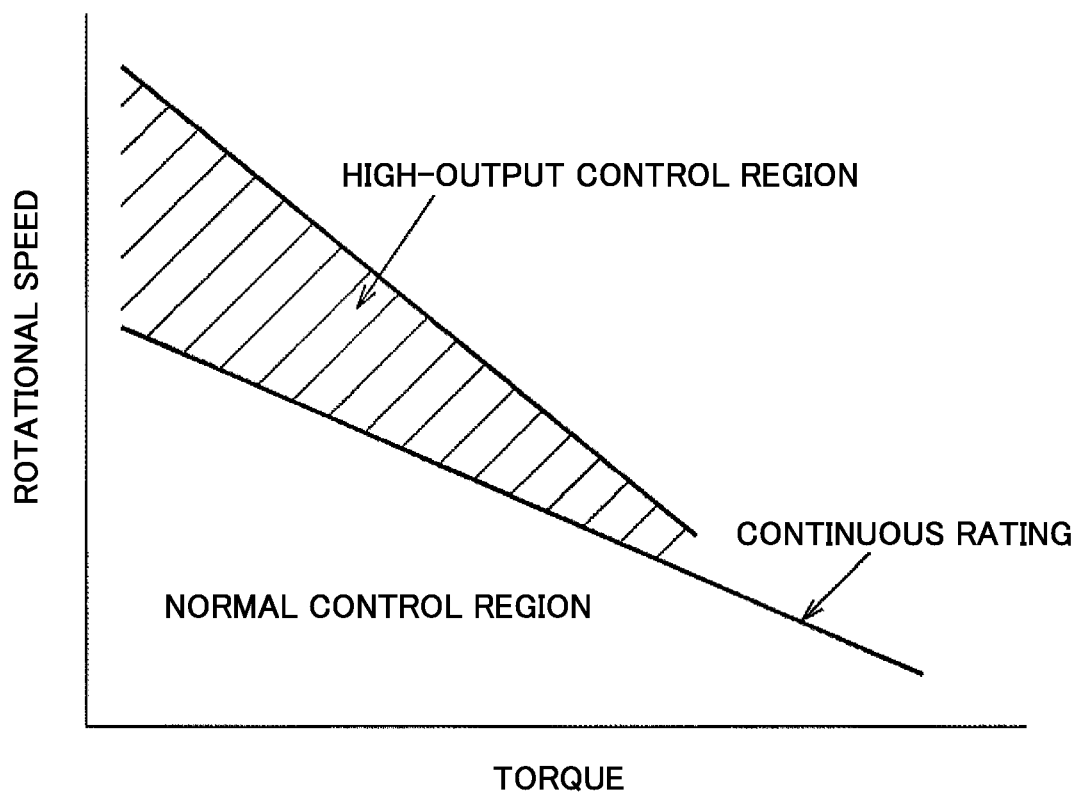
FIG. 6 is a graph illustrating an example of the relationship between output torque and the rotational speed of the electric motor.

FIG. 5 is a schematic diagram illustrating an example of the configuration of the electric motor 80 and the control device 9. FIG. 5 illustrates components of the control device 9 related to the control of the electric motor 80. FIG. 6 is a graph illustrating an example of the relationship between output torque and the rotational speed of the electric motor 80.

The electric motor 80 includes a rotor 81 that has a plurality of magnetic poles, and a stator 82 that has coils 821 to 823 for three phases. In the example illustrated in FIG. 5, the number of pairs of poles of the rotor 81 is one, and the rotor 81 has one pair of magnetic poles (an N pole 811 and an S pole 812). The rotor 81 may have a plurality of pairs of magnetic poles. The stator 82 has a U-phase coil 821, a V-phase coil 822, and a W-phase coil 823 disposed at equal intervals along the direction of rotation of the rotor 81. Phase currents supplied from the control device 9 to the coils 821 to 823 for the respective phases are detected by current sensors 93.

The electric motor 80 has three Hall sensors 831 to 833 that detect the rotational angle of the rotor 81 with respect to the stator 82. The Hall sensors 831 to 833 detect the magnetic fields of the N pole 811 and the S pole 812 of the rotor 81, and outputs detection signals to the control device 9. The control device 9 can detect the rotational angle of the rotor 81 in multiples of 60° in accordance with the detection signals from the Hall sensors 831 to 833.

As illustrated in FIG. 6, the electric motor 80 can output larger torque as the rotational speed is lower, and the magnitude of torque that can be output becomes smaller as the rotational speed becomes higher. The fastening force of the friction clutch 53 becomes larger as the rotational speed and output torque of the electric motor 80 are higher. The electric motor 80 can also output large torque at a high rotational speed temporarily while exceeding its continuous rating, which can be output continuously for a long period of time. Hereinafter, a region of a rotational speed and torque lower than the continuous rating will be referred to as a normal control region, and a region of a rotational speed and torque higher than the continuous rating will be referred to as a high-output control region.

The control device 9 has a control unit 91 and an inverter circuit 92. The control unit 91 has a central processing unit (CPU) and a storage unit constituted of a semiconductor memory, and functions as a high fastening force-requiring state determination unit 911, a target rotational speed setting unit 912, a PWM duty setting unit 913, and a drive signal generation unit 914 when the CPU executes a program stored in the storage unit. The control unit 91 executes processes to be discussed later in predetermined computation cycles (e.g. 5 ms).

The control unit 91 can acquire vehicle information that includes the respective rotational speeds (wheel speeds) of the front wheels 104R, 104L and the rear wheels 105R, 105L and the accelerator operation amount through an in-vehicle communication network such as a controller area network (CAN). The vehicle information can include detection values from various in-vehicle sensors etc., besides the wheel speeds and the accelerator operation amount. The control unit 91 can also acquire detection signals from the Hall sensors 831 to 833 and the current sensors 93 and a signal that indicates the select state of the select switch 10.

The high fastening force-requiring state determination unit 911 determines, on the basis of the vehicle information and the select state of the select switch 10 which have been acquired, whether or not the vehicle is in a high fastening force-requiring state in which it is necessary for the friction clutch 53 to transfer a large drive force temporarily. The result of the determination is sent to the target rotational speed setting unit 912. The target rotational speed setting unit 912 sets the target rotational speed such that the electric motor 80 is controlled in the high-output control region in the case where it is determined that the vehicle is in the high fastening force-requiring state, and in the normal control region in the case where it is not determined that the vehicle is in the high fastening force-requiring state. The determination process which is performed by the high fastening force-requiring state determination unit 911 will be discussed in detail later.

The target rotational speed setting unit 912 sets the target rotational speed for the electric motor 80 such that a larger drive force is transferred to the rear wheels 105R, 105L as the rotational speed difference which is the difference between the average rotational speed of the front wheels 104R, 104L and the average rotational speed of the rear wheels 105R, 105L is larger, and as the accelerator operation amount is larger, for example, when the select state of the select switch 10 is the auto mode. When the select state of the select switch 10 is the lock mode, meanwhile, the target rotational speed setting unit 912 sets the target rotational speed for the electric motor 80 such that a hydraulic pressure that does not cause slipping of the friction clutch 53 acts on the piston 50.

The PWM duty setting unit 913 performs feedback computation of the duty of the voltage which is output from the inverter circuit 92, on the basis of the actual rotational speed of the electric motor 80 which is obtained from the detection signals from the Hall sensors 831 to 833 or the detection values of the currents from the current sensors 93, such that the electric motor 80 is rotated at the target rotational speed which is set by the target rotational speed setting unit 912. The duty is the proportion of the time for which a voltage is supplied to the coils 821 to 823 for the respective phases. Larger phase currents for U-, V-, and W-phases are supplied to the electric motor 80 as the duty is higher. The maximum value of the duty is 100%. The duty is around the maximum value when the electric motor 80 is controlled in the high-output control region.

The drive signal generation unit 914 outputs drive signals for turning on and off switching elements of the inverter circuit 92 on the basis of the duty which is set by the PWM duty setting unit 913 and the rotational angles which are detected by the Hall sensors 831 to 833.

The inverter circuit 92 has: transistors Tu1, Tu2, Tv1, Tv2, Tw1, and Tw2 that serve as six switching elements connected to each other through three-phase bridge connection; and freewheeling diodes Du1, Du2, Dv1, Dv2, Dw1, and Dw2 connected in parallel with the transistors Tu1, Tu2, Tv1, Tv2, Tw1, and Tw2. The transistors Tu1, Tv1, and Tw1 constitute an upper arm 921 of the inverter circuit 92. The transistors Tu2, Tv2, and Tw2 constitute a lower arm 922 of the inverter circuit 92.

An upper bus line 923 of the inverter circuit 92 is connected to a battery B that serves as a DC voltage source.

A lower bus line 924 is electrically grounded. Phase currents are supplied to the coils 821 to 823 for the respective phases through wires connected between the transistors Tu1 Tv1 and Tw1 of the upper arm 921 and the transistors Tu2, Tv2, and Tw2 of the lower arm 922.

The high fastening force-requiring state determination unit 911 determines that the vehicle is in the high fastening force-requiring state in any of the following cases (1) to (7).

(1) Starting on Climbing Road

When the vehicle is stationary on a climbing road, the ground load on the rear wheels 105R, 105L is large, and the ground load on the front wheels 104R, 104L is small. When the vehicle is starting on a climbing road, the front wheels 104R, 104L tend to slip. With the inner clutch plates 531 and the outer clutch plates 532 of the friction clutch 53 strongly pressed against each other in advance, however, slip of the front wheels 104R, 104L at the time of starting can be suppressed. It can be determined that the vehicle is stationary on a climbing road on the basis of a detection value from an inclinometer obtained as the vehicle information or a detection value of acceleration (G) in the front-rear direction, for example. It may always be determined that the vehicle is in the high fastening force-requiring state while the vehicle is stationary on a climbing road. However, it may also be determined that the vehicle is in the high fastening force-requiring state when an operation that leads to starting is performed, such as disengaging the foot brake or the parking brake or operating the shift lever from the parking or neutral position to a shift position for travel.

(2) Starting on Low-μ Road

When the vehicle is starting on a low-μ road, and the vehicle is in the two-wheel-drive state, the front wheels 104R, 104L tend to slip, as when the vehicle is starting on a climbing road. With the inner clutch plates 531 and the outer clutch plates 532 of the friction clutch 53 strongly pressed against each other in advance, however, slip of the front wheels 104R, 104L at the time of starting can be suppressed. It can be determined that the vehicle is on a low-μ road in accordance with whether a detection value from an outside air temperature sensor obtained as the vehicle information indicates a temperature that is equal to or less than a predetermined temperature at which the road surface tends to be frozen, whether a wiper is operating, or the like. Alternatively, it may be determined that the vehicle is on a low-μ road in accordance with the frequency of occurrence of slip during travel before the vehicle becomes stationary. It may always be determined that the vehicle is in the high fastening force-requiring state when the vehicle is stationary on a low-μ road, as when the vehicle is starting on a climbing road. However, it may also be determined that the vehicle is in the high fastening force-requiring state when a predetermined operation that leads to starting is performed.

(3) Starting in Lock Mode

When the driver sets the select switch 10 to the lock mode, it is highly likely that the driver recognizes that the vehicle is on a slippery road surface. Therefore, with the inner clutch plates 531 and the outer clutch plates 532 of the friction clutch 53 strongly pressed against each other when the vehicle is starting in the lock mode, slip of the front wheels 104R, 104L can be suppressed, as when the vehicle is starting on a climbing road or a low-μ road.

(4) Abrupt Starting

Also during abrupt starting in which the vehicle speed is equal to or less than a predetermined value and the accelerator operation amount is equal to or more than a predetermined value, the front wheels 104R, 104L tend to slip when the vehicle is in the two-wheel-drive state. Therefore, the vehicle can be started stably while suppressing slip by enhancing the fastening force of the friction clutch 53 by determining that the vehicle is in the high fastening force-requiring state when it is detected that the vehicle is starting abruptly. The high fastening force-requiring state determination unit 911 can determine that the vehicle is starting abruptly when the vehicle speed is equal to or less than 20 km/h and the accelerator operation amount is equal to or more than 50% of the amount at full throttle, for example.

(5) When Rotational Speed Difference Becomes Predetermined Value or More

When the rotational speed difference which is the difference between the average rotational speed of the front wheels 104R, 104L and the average rotational speed of the rear wheels 105R, 105L is increased, it is highly likely that one of the front wheels 104R, 104L is slipping or off the road. In such a case, the slip can be terminated or the vehicle can recover from the off-the-road state by enhancing the drive force which is distributed to the rear wheels 105R, 105L by enhancing the fastening force of the friction clutch 53. That is, a rotational speed difference that may occur when one of the front wheels 104R, 104L is slipping or off the road is set as a predetermined value in advance, and the slip can be terminated or the vehicle can recover from the off-the-road state by enhancing the fastening force of the friction clutch 53 by determining that the vehicle is in the high fastening force-requiring state when the rotational speed difference which is calculated from detection values of the respective wheel speeds of the front wheels 104R, 104L and the rear wheels 105R, 105L becomes more than the predetermined value.

(6) In Preliminary State in which it is Foreseen that Rotational Speed Difference will Become Predetermined Value or More The slip can be terminated earlier, or the vehicle can recover from the off-the-road state more immediately, by enhancing the fastening force of the friction clutch 53 by determining that the vehicle is in the high fastening force-requiring state when the vehicle is in a preliminary state in which it is foreseen that the rotational speed difference will become equal to or more than the predetermined value, rather than after the rotational speed difference becomes equal to or more than the predetermined value. It can be determined that the vehicle is in the preliminary state on the basis of the proportion (acceleration in rotation) of temporal variations in the wheel speeds, for example.

(7) When Switching is Made from Two-Wheel-Drive State to Four-Wheel-Drive State

When switching is made to the four-wheel-drive state during travel in the two-wheel-drive state, in which rotation of the propeller shaft 108 is stopped, the control device 9 engages the mesh clutch 12 by rotating the propeller shaft 108 using a drive force transferred from the rear wheels 105R, 105L to the propeller shaft 108 through the friction clutch 53. In this case, rotation of the propeller shaft 108 can be increased in speed immediately by enhancing the fastening force of the friction clutch 53 by determining that the vehicle is in the high fastening force-requiring state, which makes it possible to make a transition from the two-wheel-drive state to the four-wheel-drive state in a short time.

When it is determined that the vehicle is in the high fastening force-requiring state, the control device 9 causes the electric motor 80 to output torque that is larger than continuous rating by performing at least one of advance angle control and overlap energization control. In the advance angle control, the timing to start application of a voltage from the inverter circuit 92 to the coils 821 to 823 of the stator 82 for the respective phases is made earlier than that for a case where the electric motor 80 is controlled in the normal control region. In the overlap energization control, the transistors are turned on and off such that two of the transistors Tu1, Tv1, and Tw1 of the upper arm 921 of the inverter circuit 92 are turned on concurrently and two of the transistors Tu2, Tv2, and Tw2 of the lower arm 922 of the inverter circuit 92 are turned on concurrently.

Figure 7C:
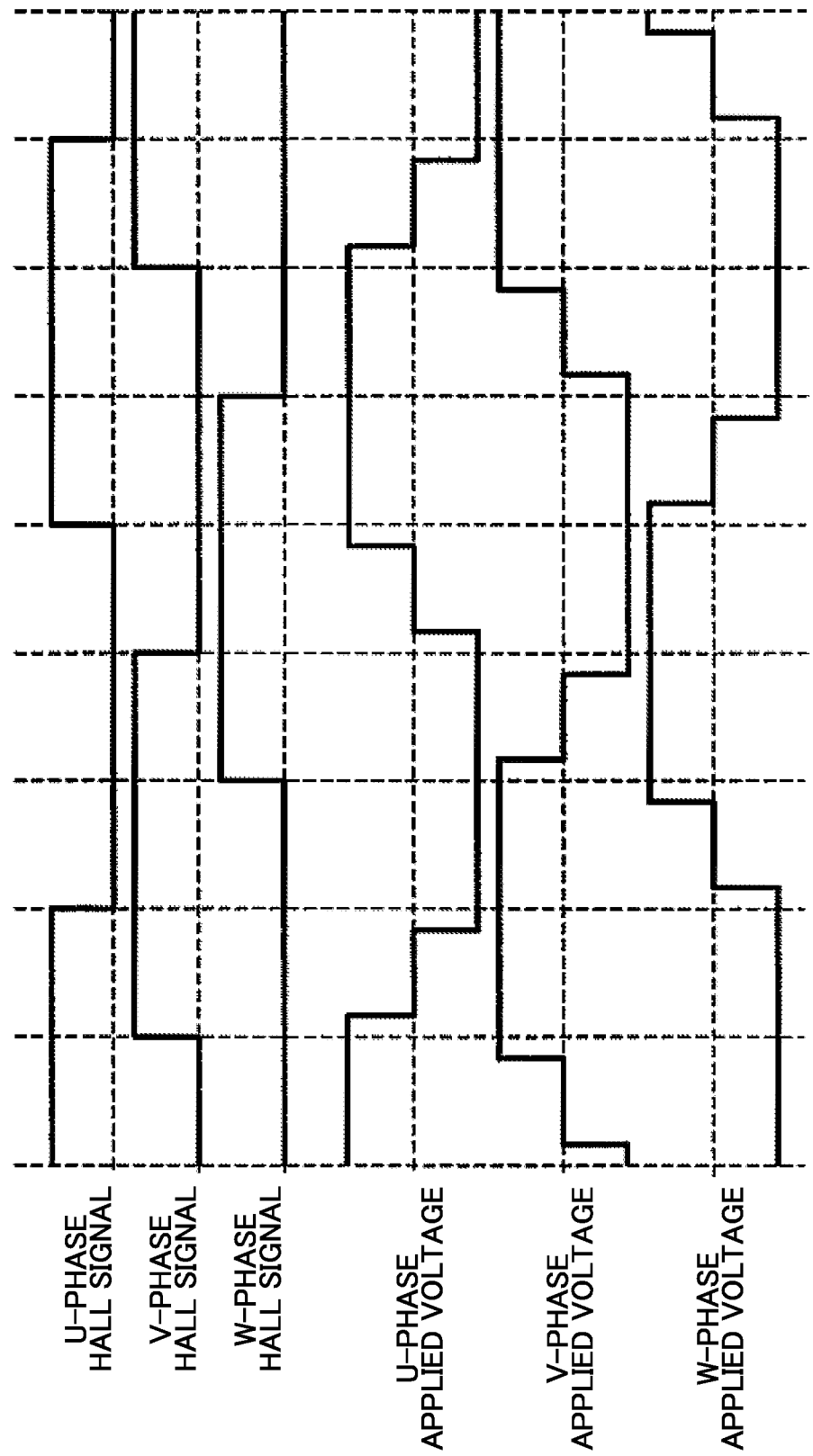
FIG. 7C is a graph illustrating an example of the on/off states of the Hall sensors and the voltages applied to U-, V-, and W-phases during rotation of the electric motor.

FIGS. 7A to 7C are each a graph illustrating an example of the on/off states of the Hall sensors 831 to 833 and the voltages applied to U-, V-, and W-phases while the rotor 81 of the electric motor 80 makes 1.5 rotations. In the drawings, the horizontal axis indicates the time. FIG. 7A illustrates waveforms for a case where the electric motor 80 is controlled in the normal control region. FIG. 7B illustrates waveforms for a case where the advance angle control is executed. FIG. 7C illustrates waveforms for a case where the overlap energization control is executed.

As illustrated in FIGS. 7A to 7C, detection values from the Hall sensors 831 to 833 are switched between the on state and the off state every electrical angle of 180°. A U-phase Hall signal, a V-phase Hall signal, and a W-phase Hall signal, which are output from the Hall sensors 831 to 833, have waveforms that are shifted in phase by an electrical angle of 120° from each other. In the present embodiment, the number of pairs of poles of the rotor 81 is one as discussed earlier, and thus the electrical angle and the mechanical angle coincide with each other.

In the case where the electric motor 80 is controlled in the normal control region, the control device 9 controls the electric motor 80 in accordance with the 120-degree energization scheme which is widely used as a method of simply controlling a three-phase brushless motor. In this event, as illustrated in FIG. 7A, a voltage on the positive side applied to U-phase falls in synchronization with the U-phase Hall signal, and is applied for an electrical angle of 120°. Meanwhile, a voltage on the negative side applied to U-phase rises in synchronization with the U-phase Hall signal, and is applied for an electrical angle of 120°. In the case where the duty is less than 100%, a PWM waveform that matches the duty appears for the electrical angle of 120°. The same applies to V-phase and W-phase.

On the other hand, in the case where the advance angle control is performed, as illustrated in FIG. 7B, the timing to start applying a voltage on the positive side and the negative side to U-phase, V-phase, and W-phase is advanced by an electrical advance angle Δθ compared to a case where the electric motor 80 is controlled in the normal control region. Although the advance angle Δθ may be a fixed value, it is desirable that the advance angle Δθ should be a value that is larger as the target rotational speed or the actual rotational speed of the electric motor 80 is higher, for example. When such advance angle control is performed, the efficiency of the electric motor 80 is lowered. However, a reduction in output torque due to a delay in phase of the phase currents, particularly in a high-speed rotation range, can be suppressed, and a larger torque can be generated compared to a case where the electric motor 80 is controlled in the normal control region.

Meanwhile, in the case where the overlap energization control is performed, as illustrated in FIG. 7C, the period for which a voltage on the positive side and the negative side is applied is longer than the electrical angle of 120°. That is, the rise of the voltage on the positive side applied to the U-phase coil 821 is advanced compared to the rise of the U-phase Hall signal, and the fall of the voltage on the negative side applied to the U-phase coil 821 is advanced compared to the fall of the U-phase Hall signal. Meanwhile, the timing of the fall of the voltage on the positive side and the negative side applied to the U-phase coil 821 is delayed compared to a case where the electric motor 80 is controlled in the normal control region. The same applies to V-phase and W-phase. When such overlap energization control is performed, the efficiency of the electric motor 80 is lowered. However, a larger torque can be generated compared to a case where the electric motor 80 is controlled in the normal control region.

The advance angle control and the overlap energization control may be performed concurrently with each other. In this case, the voltages applied to the respective phases have waveforms obtained by further advancing the timing of the rise of the voltages on the positive side and the negative side applied to the respective phases in the waveforms indicated in FIG. 7C by Δθ, for example. Field weakening control may be performed when the electric motor 80 is controlled in the high-output control region.

In the embodiment of the present invention described above, the control device 9 controls the electric motor 80 in the high-output control region when it is necessary for the friction clutch 53 to transfer a large drive force temporarily. Thus, a required fastening force can be obtained even if the number of clutch plates (inner clutch plates 531 and outer clutch plates 532) of the friction clutch 53 is reduced compared to a case where the electric motor 80 is always controlled in the normal control region as in the related art, which makes it possible to reduce the cost and the size of the drive force transfer device 1 by reducing the number of clutch plates.

What is claimed is:

1. A four-wheel-drive vehicle comprising:
   an electric motor;
   a pump that is actuated by torque output from the electric motor;
   a piston that is movable by a pressure of a working fluid discharged from the pump;
   a friction clutch that has a plurality of clutch plates that are pressed by the piston;
   a control device that controls the electric motor;
   a drive source that generates a drive force in accordance with an accelerator operation amount;
   main drive wheels to which the drive force of the drive source is always transferred; and
   auxiliary drive wheels to which the drive force of the drive source is transferred in accordance with a fastening force of the friction clutch, wherein
   the control device causes the electric motor to output torque that is larger than torque that the electric motor can continuously output when it is determined, on the basis of vehicle information including respective wheel speeds of the main drive wheels and the auxiliary drive wheels and the accelerator operation amount, that the vehicle is in a high fastening force-requiring state in which it is necessary for the friction clutch to transfer a large drive force temporarily.

2. The four-wheel-drive vehicle according to claim 1, wherein
   the control device determines that the vehicle is in the high fastening force-requiring state when the vehicle is starting on a climbing road or a low-μ road, or when the vehicle is starting in a lock mode in which slipping of the friction clutch is not caused.

3. The four-wheel-drive vehicle according to claim 1, wherein the control device determines that the vehicle is in the high fastening force-requiring state during abrupt starting in which a vehicle speed is equal to or less than a predetermined value and the accelerator operation amount is equal to or more than a predetermined value.

4. The four-wheel-drive vehicle according to claim 1, wherein
the control device determines that the vehicle is in the high fastening force-requiring state when a rotational speed difference, which is a difference between a rotational speed of the main drive wheels and a rotational speed of the auxiliary drive wheels, is equal to or more than a predetermined value, or when the vehicle is in a preliminary state in which it is foreseen that the rotational speed difference will become equal to or more than the predetermined value.

5. The four-wheel-drive vehicle according to claim 1, wherein:
the drive force of the drive source is transferred to the friction clutch via a propeller shaft;
the drive force of the drive source is transferred to the propeller shaft via a mesh clutch; and
the control device determines that the vehicle is in the high fastening force-requiring state when switching is made to a four-wheel-drive state during travel in a two-wheel-drive state, in which rotation of the propeller shaft is stopped with transfer of the drive force through the friction clutch and the mesh clutch blocked, and engages the mesh clutch by rotating the propeller shaft using a drive force transferred from the auxiliary drive wheels to the propeller shaft through the friction clutch.

6. The four-wheel-drive vehicle according to claim 1, wherein:
the electric motor is a three-phase brushless motor; and
the control device causes the electric motor to output torque that is larger than torque that the electric motor can continuously output by performing at least one of advance angle control and overlap energization control when it is determined that the vehicle is in the high fastening force-requiring state.

7. A method of controlling a four-wheel-drive vehicle including an electric motor, a pump that is actuated by torque output from the electric motor, a piston that is movable by a pressure of a working fluid discharged from the pump, a friction clutch that has a plurality of clutch plates that are pressed by the piston, a control device that controls the electric motor, a drive source that generates a drive force in accordance with an accelerator operation amount, main drive wheels to which the drive force of the drive source is always transferred, and auxiliary drive wheels to which the drive force of the drive source is transferred in accordance with a fastening force of the friction clutch, the method comprising:
determining, on the basis of vehicle information including respective wheel speeds of the main drive wheels and the auxiliary drive wheels and the accelerator operation amount, that the vehicle is in a high fastening force-requiring state in which it is necessary for the friction clutch to transfer a large drive force temporarily, and causing the electric motor to output torque that is larger than torque that the electric motor can continuously output when it is determined that the vehicle is in the high fastening force-requiring state.

* * * * *